United States Patent
Choke et al.

(10) Patent No.: US 9,608,797 B2
(45) Date of Patent: Mar. 28, 2017

(54) ADAPTIVE ENVELOPE EXTRACTING APPARATUS, SIGNAL DECODING APPARATUS AND SHORT-DISTANCE CONTACTLESS COMMUNICATION APPARATUS APPLYING THE ADAPTIVE ENVELOPE EXTRACTING APPARATUS, AND METHOD THEREOF

(71) Applicant: MediaTek Singapore Pte. Ltd., Singapore (SG)

(72) Inventors: Tieng Ying Choke, Singapore (SG); Jun-Wei Lin, New Taipei (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 179 days.

(21) Appl. No.: 14/414,701

(22) PCT Filed: Sep. 4, 2014

(86) PCT No.: PCT/CN2014/085938
§ 371 (c)(1),
(2) Date: Jan. 13, 2015

(87) PCT Pub. No.: WO2015/032338
PCT Pub. Date: Mar. 12, 2015

(65) Prior Publication Data
US 2015/0207616 A1    Jul. 23, 2015

Related U.S. Application Data

(60) Provisional application No. 61/873,442, filed on Sep. 4, 2013.

(51) Int. Cl.
*H04B 5/00*    (2006.01)
*H04L 7/00*    (2006.01)
(Continued)

(52) U.S. Cl.
CPC ............ *H04L 7/0087* (2013.01); *H04B 5/00* (2013.01); *H04B 5/0031* (2013.01);
(Continued)

(58) Field of Classification Search
CPC ... H04L 7/0087; H04L 27/0008; H04L 27/02; H04B 5/00; H04B 5/0031; H04B 5/0075
(Continued)

(56) References Cited

U.S. PATENT DOCUMENTS

2006/0198364 A1    9/2006  Fujii
2007/0159955 A1*   7/2007  Nagai ................ G11B 7/24082
                                                        369/275.4

FOREIGN PATENT DOCUMENTS

CN    101075749 A    11/2007
WO    2008041252 A1    4/2008

OTHER PUBLICATIONS

"International Search Report" mailed on Nov. 28, 2014 for International application No. PCT/CN2014/085938, International filing date: Sep. 4, 2014.

* cited by examiner

Primary Examiner — Eugene Yun
(74) Attorney, Agent, or Firm — Winston Hsu; Scott Margo

(57) ABSTRACT

An envelope extracting apparatus includes: a clock extracting device arranged to extract a clock signal of a receiving modulation signal according to a first biasing voltage; and an edge detecting device arranged to generate a detecting signal to indicate an envelope edge of the receiving modulation signal according to a delayed clock signal of the clock signal and a second biasing voltage; wherein the second biasing voltage or a delay time of the clock signal is adjustable.

14 Claims, 12 Drawing Sheets

(51) Int. Cl.
 *H04L 27/00* (2006.01)
 *H04L 27/02* (2006.01)
(52) U.S. Cl.
 CPC ....... *H04B 5/0075* (2013.01); *H04L 27/0008* (2013.01); *H04L 27/02* (2013.01)
(58) Field of Classification Search
 USPC ........................................................ 455/41.1
 See application file for complete search history.

ADAPTIVE ENVELOPE EXTRACTING APPARATUS, SIGNAL DECODING APPARATUS AND SHORT-DISTANCE CONTACTLESS COMMUNICATION APPARATUS APPLYING THE ADAPTIVE ENVELOPE EXTRACTING APPARATUS, AND METHOD THEREOF

CROSS REFERENCE TO RELATED APPLICATIONS

This application claims the benefit of U.S. Provisional Application No. 61/873,442, which was filed on 2013 Sep. 4 and is included herein by reference.

TECHNICAL FIELD

The present invention relates to an adaptive envelope extracting apparatus, a signal decoding apparatus and a short-distance contactless communication apparatus applying the adaptive envelope extracting apparatus, and more particularly to an adaptive envelope detector with adaptive threshold decision, and method thereof.

BACKGROUND

Short-range, standards-based contactless connectivity technology such as Near field communication (NFC) uses magnetic field induction to enable communication between electronic devices in close proximity. Based on RFID technology, NFC provides a medium for the identification protocols that validates secure data transfer. The signal of the NFC is modulated by ASK (Amplitude shift keying) modulation. To receive the data of the NFC signal correctly, the envelope of the NFC signal should first be extracted. In other words, the rising edge and the falling edge of the envelope of the NFC signal should be precisely detected in order to correctly demodulate the data of the NFC signal. For example, an NFC device may refer the length of low voltage level in the envelope to determine the data bit of the NFC signal. If the error of the length of the low voltage level in the envelope is too big, then the data bit of the NFC signal may not be correctly demodulated. In another example, for the NFC PICC devices to be compliant to ISO 14443, the frame delay time (FDT), which is defined as the time between the transmit and receive frames, must be within the specified timing window, i.e. a specific integer multiple of carrier signal (fc) with tight tolerance of 5/fc. Therefore, an accurate detection of the envelope of the NFC signal is required to generate the accurate FDT time.

Conventionally, a rectifier based envelope demodulator is used to extract the envelope of the NFC signal. However, the rectifier based envelope demodulator is not immune to the non-monotonic glitches in the NFC signal. For example, a conventional envelope demodulator is arranged to use a diode to rectify the NFC signal, and use an RC (resistor-capacitor) circuit to output the envelope of the NFC signal. In this conventional envelope demodulator, as shown in FIG. 1, which is a timing diagram illustrating the ripple effect of the conventional envelope demodulator, the ripple effect will appear on the extracted envelope due to capacitor discharging effect for successive peak. The time constant of the RC circuit may cause the negative clipping effect as shown in FIG. 1. The nonlinear behavior of the diode may cause distortion to the envelope as the current flows through the diode. In addition, the RC circuit may occupy a large chip area. Therefore, providing an envelope detector capable of precisely detecting the falling and rising edges of the envelope of the NFC signal is an urgent problem in the NFC field.

SUMMARY

One of the objectives of the present invention is to provide an adaptive envelope detector with adaptive threshold decision so as to precisely detect the falling and rising edges of the envelope of an NFC signal, and method thereof.

According to a first embodiment of the present invention, an envelope extracting apparatus is disclosed. The envelope extracting apparatus comprises a clock extracting device and an edge detecting device. The clock extracting device is arranged to extract a clock signal of a receiving modulation signal according to a first biasing voltage. The edge detecting device is arranged to generate a detecting signal to indicate an envelope edge of the receiving modulation signal according to a delayed clock signal of the clock signal and a second biasing voltage; wherein the second biasing voltage or the delay time of the clock signal is adjustable.

According to a second embodiment of the present invention, a signal decoding apparatus is disclosed. The signal decoding apparatus comprises an envelope extracting apparatus, a phase-locked loop, and a decoding device. The envelope extracting apparatus is arranged to extract an envelope signal of a receiving modulation signal, and to generate a clock signal of the receiving modulation signal. The phase-locked loop is arranged to generate a continuous clock signal according to the clock signal and the envelope signal. The decoding device is arranged to generate a digital output data according to the envelope signal and the continuous clock signal.

According to a third embodiment of the present invention, a short-distance contactless communication apparatus is disclosed. The short-distance contactless communication comprises an envelope extracting apparatus, a timer, and a transmitter. The envelope extracting apparatus is arranged to extract an envelope signal of a receiving modulation signal. The timer is arranged to count for a frame delay time according to the envelope signal of the receiving modulation signal. The transmitter is arranged to transmit a transmitting modulation signal when the frame delay time counted by the timer is up.

According to a fourth embodiment of the present invention, an envelope extracting method is disclosed. The envelope extracting method comprises: extracting a clock signal of a receiving modulation signal according to a first biasing voltage; and generating a detecting signal to indicate an envelope edge of the receiving modulation signal according to a delayed clock signal of the clock signal and a second biasing voltage; wherein the second biasing voltage or the delay time of the clock signal is adjustable.

According to a fifth embodiment of the present invention, a signal decoding method is disclose. The signal decoding method comprises: extracting an envelope signal of a receiving modulation signal, and generating a clock signal of the receiving modulation signal; generating a continuous clock signal according to the clock signal and the envelope signal; and generating a digital output data according to the envelope signal and the continuous clock signal.

According to a sixth embodiment of the present invention, a short-distance contactless communication method is disclosed. The short-distance contactless communication method comprises: extracting an envelope signal of a receiving modulation signal; counting a frame delay time according to the envelope signal of the receiving modulation signal; and transmitting a transmitting modulation signal when the frame delay time is up.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
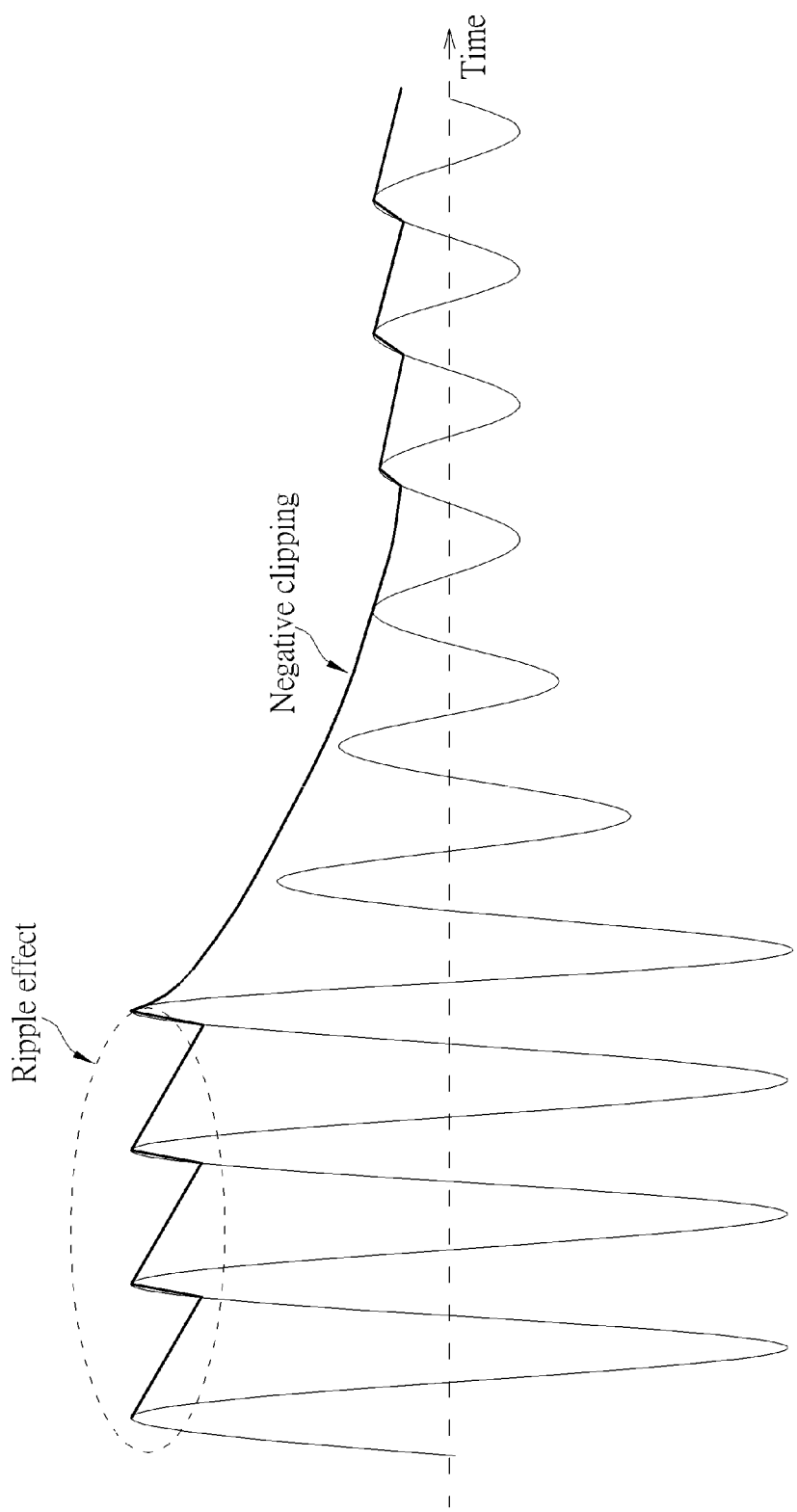
FIG. 1 is a timing diagram illustrating the ripple effect of a conventional envelope demodulator.
Figure 2:
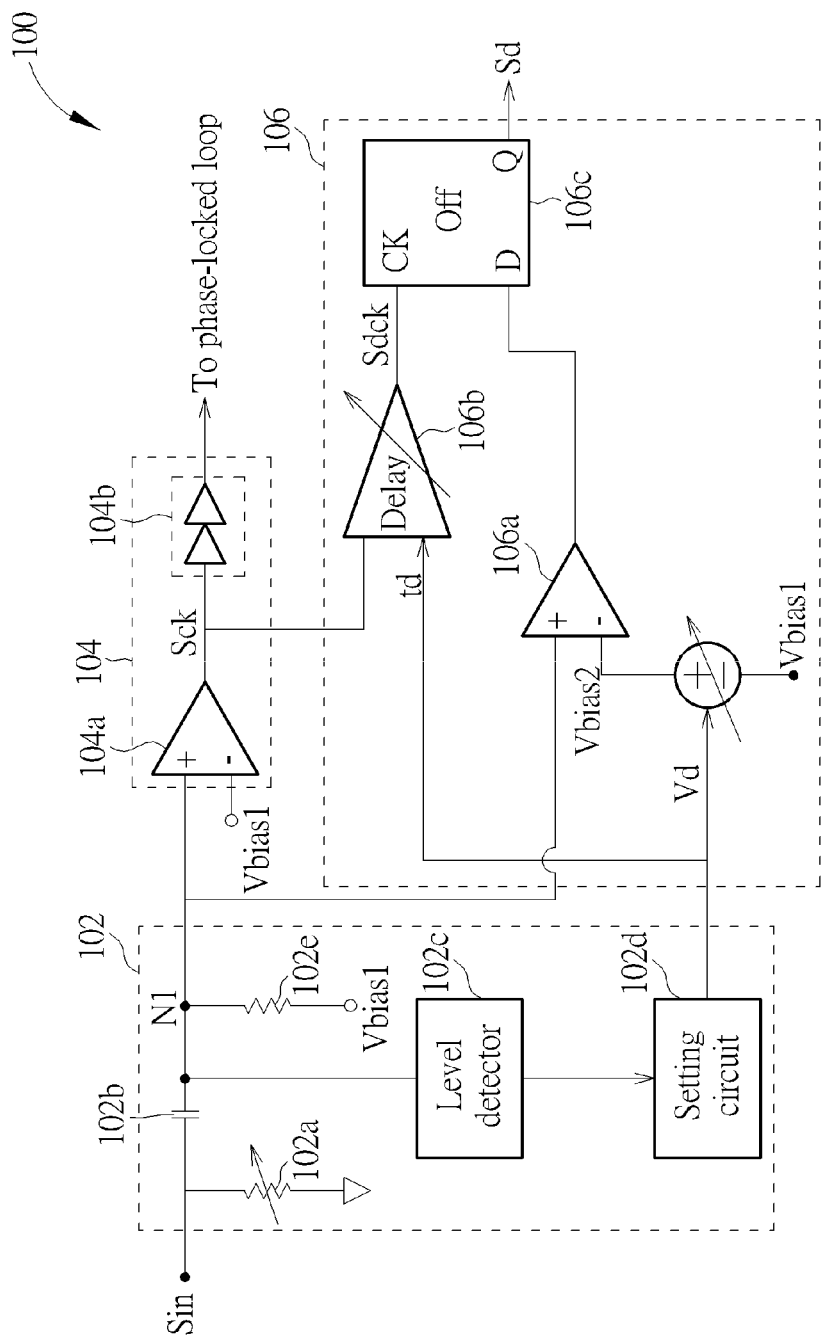
FIG. 2 is a diagram illustrating an envelope extracting apparatus according to an embodiment of the present invention.

Please refer to FIG. 2, which is a diagram illustrating an envelope extracting apparatus 100 according to an embodiment of the present invention. The envelope extracting apparatus 100 is arranged to receive short-distance contactless communication signal (e.g. a near-field communication (NFC) signal). The receiving modulation signal Sin may be a 100% ASK (Amplitude shift keying) signal, and the oscillating frequency of the carrier of the NFC signal may be 13.56 MHz. The envelope extracting apparatus 100 comprises a determining device 102, a clock extracting device 104, and an edge detecting device 106. The determining device 102 is arranged to determine a delay time td and an offset voltage vd according to the receiving modulation signal Sin. The clock extracting device 104 is arranged to extract a clock signal Sck of the receiving modulation signal Sin according to a first biasing voltage Vbias1. The edge detecting device 106 is arranged to generate a detecting signal Sd to indicate an envelope edge of the receiving modulation signal Sin according to a delayed clock signal Sdck of the clock signal Sck and a second biasing voltage Vbias2. The second biasing voltage Vbias2 is different from the first biasing voltage Vbias1. The delayed clock signal Sdck is generated by delaying the clock signal Sck by the delay time td, and the second biasing voltage Vbias2 is generated by offsetting the first biasing voltage Vbias1 by the offset voltage vd.

The determining device 102 comprises an adjustable resistor 102a, a capacitor 102b, a level detector 102c, a setting circuit 102d, and a biasing resistor 102e. The adjustable resistor 102a in combination with the capacitor 102b are arranged to pass the AC signal of the receiving modulation signal Sin to the terminal N1. The biasing resistor 102e having a first terminal coupled to the terminal N1 and a second terminal coupled to the first biasing voltage Vbias1. The level detector 102c is arranged to detect the amplitude of the receiving modulation signal Sin. The setting circuit 102d is arranged to set the delay time td and the offset voltage vd according to the amplitude of the receiving modulation signal Sin.

The clock extracting device 104 comprises a comparator 104a and a delay circuit 104b. The comparator 104a is arranged to compare a voltage level of the receiving modulation signal Sin with the first biasing voltage Vbias1 to output the clock signal Sck. The delay circuit 104b is arranged to delay the clock signal by a delay time.

The edge detecting device 106 comprises a comparator 106a, a delay circuit 106b, and a latching circuit 106c. The comparator 106a is arranged to compare the voltage level of the receiving modulation signal Sin with the second biasing voltage Vbias2 to output a comparing output signal Sc. The delay circuit 106b is arranged to delay the clock signal Sck by the delay time td to generate the delayed clock signal Sdck. The latching circuit 106c is arranged to latch the comparing output signal Sc by using the delayed clock signal Sdck to generate the detecting signal Sd. The latching circuit 106c may be a D flip-flop (DFF).

Figure 3:
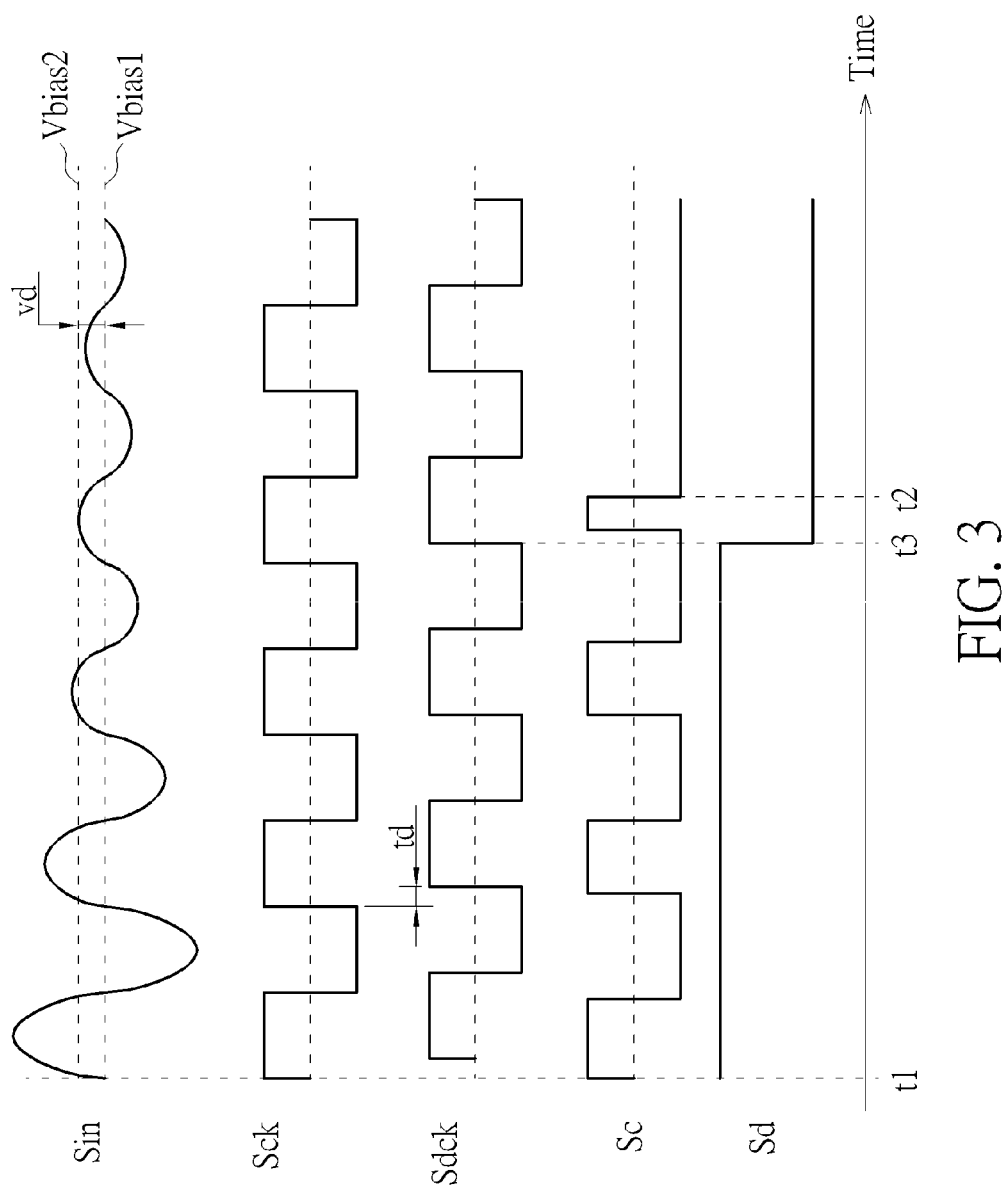
FIG. 3 is a timing diagram illustrating a receiving modulation signal, a clock signal, a delayed clock signal, a comparing output signal, and a detecting signal according to an embodiment of the present invention.

According to the embodiment, the determining device 102 is arranged to adaptively adjust the delay time td and the offset voltage vd according to the receiving modulation signal in order to made the edge detecting device 106 extract the envelope of the receiving modulation signal Sin correctly. Please refer to FIG. 3, which is a timing diagram illustrating the receiving modulation signal Sin, the clock signal Sck, the delayed clock signal Sdck, the comparing output signal Sc, and the detecting signal Sd according to an embodiment of the present invention. According to the embodiment, the receiving modulation signal Sin is a 100% ASK (Amplitude shift keying) signal having carrier frequency of 13.56 MHz, and the amplitude of the receiving modulation signal Sin gradually decrease after time t1. The first biasing voltage Vbias1 is placed in the middle of the receiving modulation signal Sin. Therefore, the clock signal Sck with 50% duty-cycle can be obtained at the output of the comparator 104a. The second biasing voltage Vbias2 is higher than (i.e. offset) the first biasing voltage Vbias1 by the offset voltage vd. Then, the comparing output signal Sc with duty-cycle less than 50% is outputted by the comparator 106a. The duty-cycle of the comparing output signal Sc gradually decreases after time t1, and the voltage level of the comparing output signal Sc will become the low voltage level (e.g. the ground voltage) after the time t2 or after the voltage level of the receiving modulating signal Sin is lower than the second biasing voltage Vbias2. After the clock signal Sck is delayed by the delay time td, the rising edge of the delayed clock signal Sdck will sample the high voltage level of the comparing output signal Sc if the high voltage level of the comparing output signal is wide enough. As shown in FIG. 3, the rising edge of the delayed clock signal Sdck can still sample the high voltage level of the comparing output signal Sc before the time t3. However, at the time t3, the rising edge of the delayed clock signal Sdck samples the low voltage level of the comparing output signal Sc. Accordingly, the detecting signal Sd changes to the low voltage level from the high voltage level at the time t3. According to the embodiment, the falling edge of the detecting signal Sd can be regarded as the falling edge of the envelope of the receiving modulating signal Sin. Therefore, when a pause detection of changing voltage to the low voltage level from the high voltage level is generated by the edge detecting device 106, indicating that a falling edge of the envelope of the receiving modulating signal Sin is generated.

According to the description of FIG. 3, it is obvious that the values of the delay time td and the offset voltage vd, alone or in combination, will decide the occurrence of the falling edge of the detecting signal Sd. More specifically, if the delay time td is set larger, then the occurrence of the falling edge of the detecting signal Sd may be later than the time t3. If the delay time td is set smaller, then the occurrence of the falling edge of the detecting signal Sd may be earlier than the time t3. If the offset voltage vd is set larger, then the occurrence of the falling edge of the detecting signal Sd may be earlier than the time t3. If the offset voltage vd is set larger, then the occurrence of the falling edge of the detecting signal Sd may be later than the time t3. Therefore, the envelope extracting apparatus 100 is capable of adjusting the values of the delay time td and/or the offset voltage vd to adaptively control the occurrence of the falling edge of the detecting signal Sd.

It is noted that although the operation of the envelope extracting apparatus 100 is illustrated by detecting the falling edge of the envelope of the receiving modulation signal Sin as shown in FIG. 3, those skill in the art are appreciated to understand the envelope extracting apparatus 100 can detect the rising edge of the envelope of the receiving modulation signal Sin also. The detection of the rising edge of the envelope of the receiving modulation signal Sin is similar to the detection of the falling edge of the envelope of the receiving modulation signal Sin, thus the detailed description is omitted here for brevity. According to the operation of the envelope extracting apparatus 100, when the falling edge and the rising edge of the envelope of the receiving modulation signal Sin are detected, meaning that the envelope of the receiving modulation signal Sin is also obtained.

Figure 4:
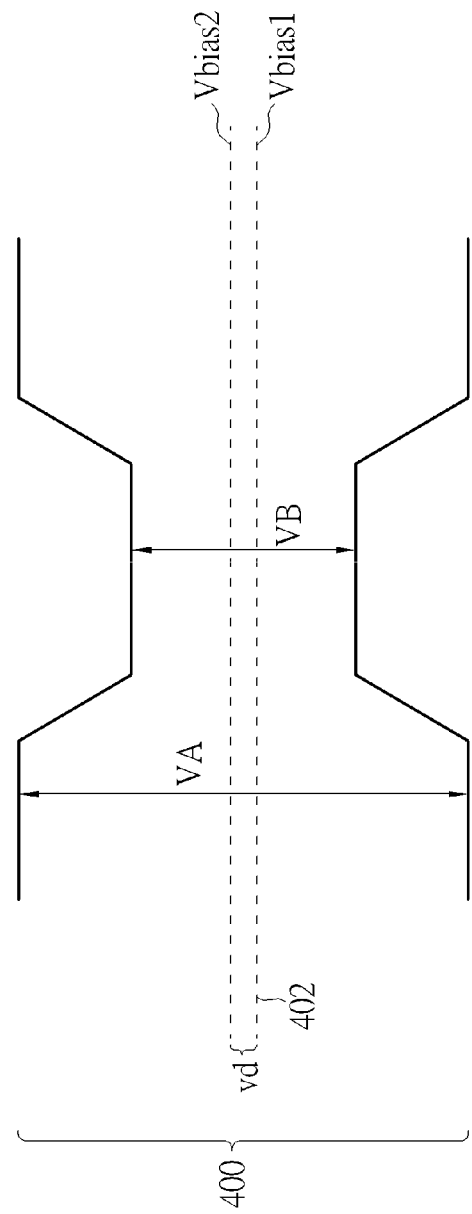
FIG. 4 is a diagram illustrating an envelope of a receiving modulation signal according to an embodiment of the present invention.

Please refer to FIG. 4, which is a diagram illustrating an envelope 400 of the receiving modulation signal Sin according to an embodiment of the present invention. The dashed line 402 is the envelope reference of the envelope 400. The dashed line 402 is substantially in the middle of the envelope 400. The dashed line 402 also represents the first biasing voltage Vbias1. The voltage range VA is the high voltage area of the envelope 400, and the voltage range VB is the low voltage area of the envelope 400. The modulation index (or modulation depth) of the receiving modulation signal Sin is defined as $[(VA-VB)/(VA+VB)]*100\%$. According to the specification of NFC, there has three type of NFC signals, i.e. Type A, Type B, and Type F. If the signal type of the receiving modulation signal Sin is Type A, then the modulation index is 100% and the pause detection (i.e. the falling edge of the detecting signal Sd) should be generated. If the signal type of the receiving modulation signal Sin is Type B, then the modulation index is 8-14% and the pause detection will not be activated. If the signal type of the receiving modulation signal Sin is Type F, then the modulation index is 8-30% and the pause detection will not be activated. Therefore, when the determining device 102 determines that the receiving modulation signal Sin is Type A, the determining device 102 will adaptively adjust the second biasing voltage Vbias2 (i.e. the offset voltage vd) to be low enough for generating the pause detection.

Figure 5:
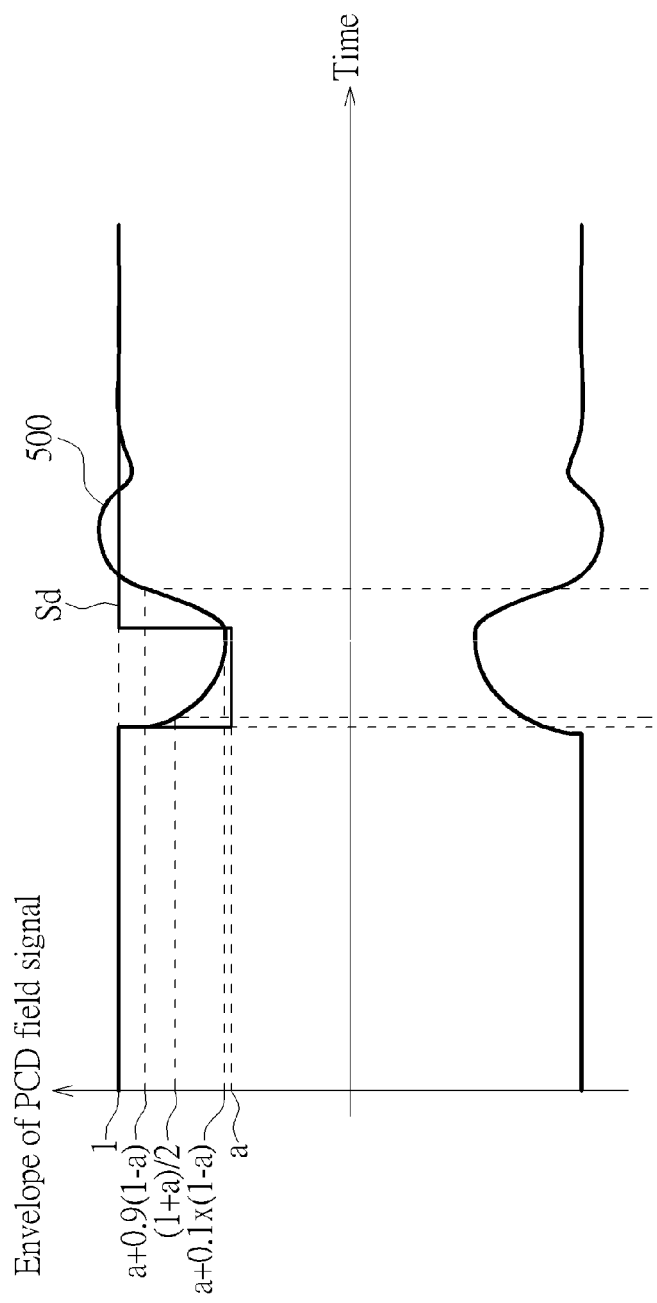
FIG. 5 is a timing diagram illustrating the definition of an envelope of a Type A NFC signal according to an embodiment of the present invention.

In addition, once the signal type of the receiving modulation signal Sin is determined to be Type A, the determining device 102 will continue adjust the second biasing voltage Vbias2 (i.e. the offset voltage vd) according to the data-rate of the receiving modulation signal Sin. This is because the modulation depth of the Type A signal has different value for different data-rate. Please refer to FIG. 5, which is a timing diagram illustrating the definition of an envelope 500 of a Type A NFC signal according to an embodiment of the present invention. The parameter a can be regarded as the low amplitude level of the envelope 500 of the Type A NFC signal, i.e. the envelop of PCD field signal. For data-rate of fc/64, i.e. 212 kbit/s, the parameter a is 0~0.2. For data-rate of fc/32, i.e. 424 kbit/s, the parameter a is 0~0.4. For data-rate of fc/16, i.e. 848 kbit/s, the parameter a is 0.2~0.6. Therefore, the determining device 102 should continue adjust the second biasing voltage Vbias2 according to data-rate of the Type A NFC signal in order to output the pause detection of the envelope 500.

Figure 6:
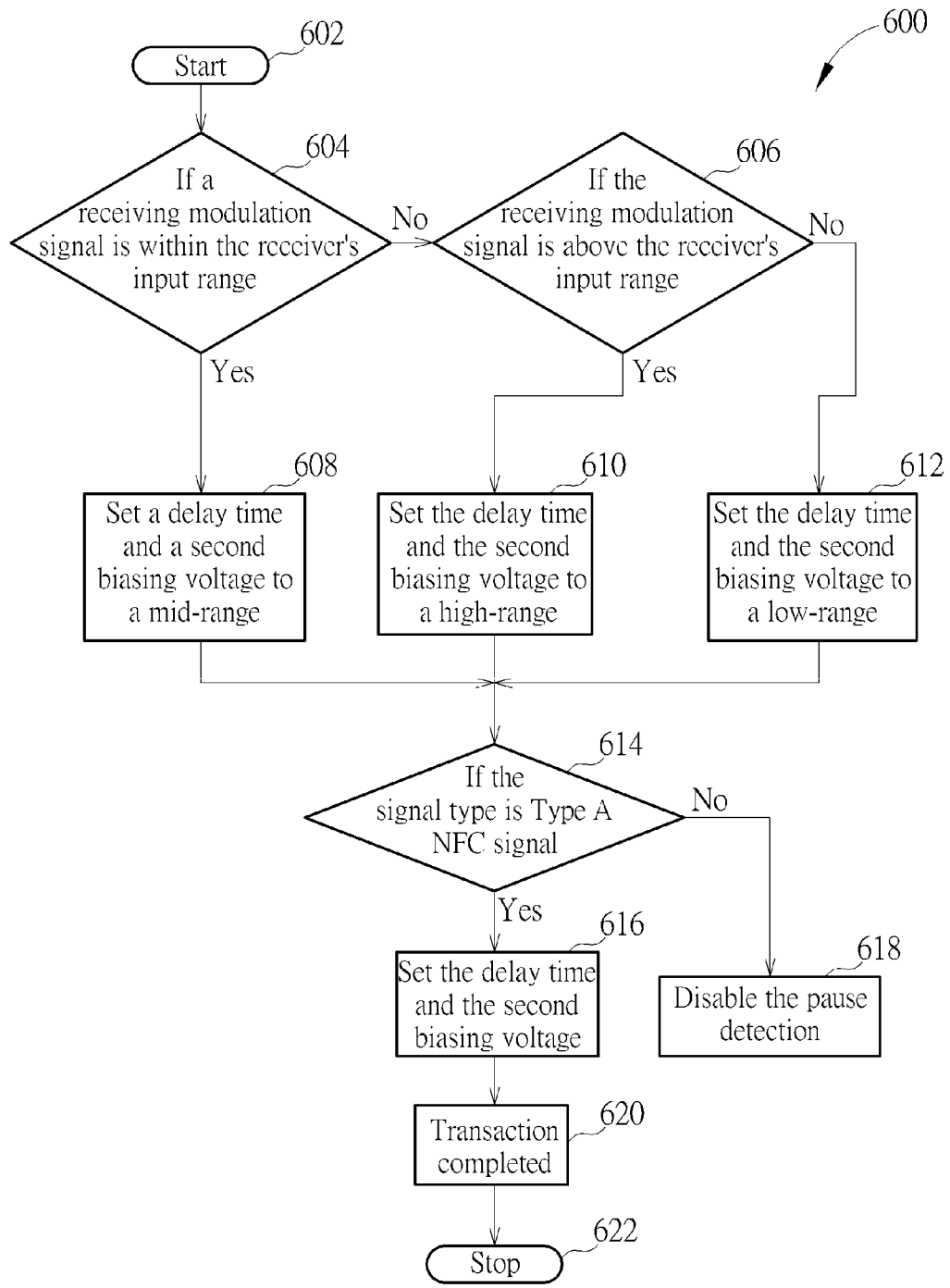
FIG. 6 is a flowchart illustrating an adaptive threshold setting algorithm according to an embodiment of the present invention.

In summary, the operation of the proposed envelope extracting apparatus 100 can be summarized into the following steps in FIG. 6. FIG. 6 is a flowchart illustrating an adaptive threshold setting algorithm 600 according to an embodiment of the present invention. Provided that substantially the same result is achieved, the steps of the flowchart shown in FIG. 6 need not be in the exact order shown and need not be contiguous; that is, other steps can be intermediate. The adaptive threshold setting algorithm 600 comprises the steps:

Step 602: Start the adaptive threshold of Type A NFC signal detection;
Step 604: Determine if the amplitude of the receiving modulation signal Sin is within the receiver's input range, if yes, go to step 608, if no, go to step 606;
Step 606: Determine if the amplitude of the receiving modulation signal Sin is above the receiver's input range, if yes, go to step 610, if no, go to step 612;
Step 608: Set the delay time and the second biasing voltage Vbias2 to a mid-range for detecting if the receiving modulation signal Sin is the Type A NFC signal, go to step 614;
Step 610: Set the delay time and the second biasing voltage Vbias2 to a high-range for detecting if the receiving modulation signal Sin is the Type A NFC signal, go to step 614;

Step 612: Set the delay time and the second biasing voltage Vbias2 to a low-range for detecting if the receiving modulation signal Sin is the Type A NFC signal, go to step 614;

Step 614: Determine if the signal type of the receiving modulation signal Sin is the Type A NFC signal, if yes, go to step 616, if no, go to step 618;

Step 616: Set the delay time and the second biasing voltage Vbias2 to a voltage level such that the modulation depth of data-rate as high as 848 kbit/s can be detected, go to step 620;

Step 618: Disable the pause detection;

Step 620: Transaction completed;

Step 622: Stop the Type A NFC signal detection.

Figure 7:
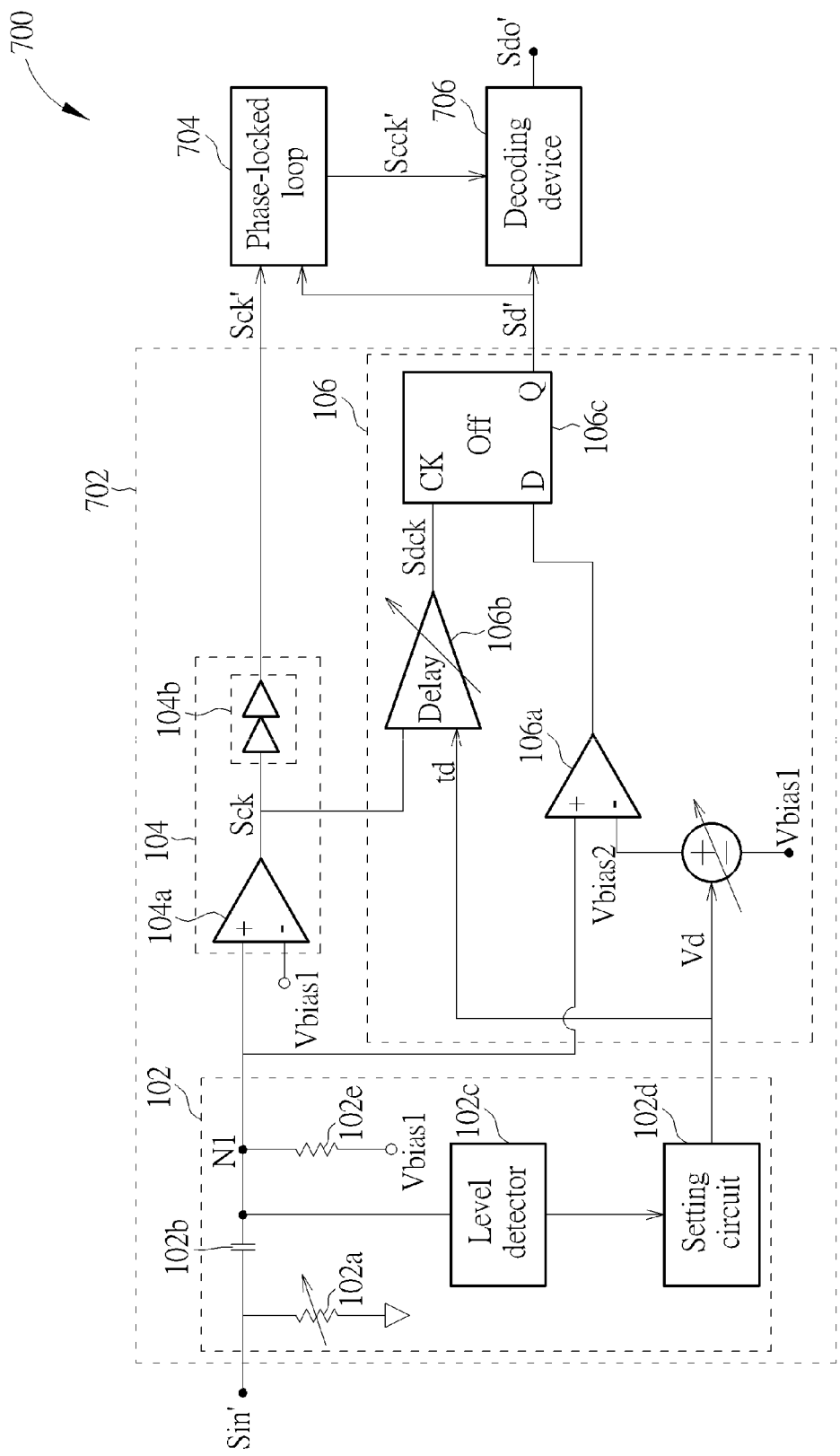
FIG. 7 is a diagram illustrating a signal decoding apparatus according to an embodiment of the present invention.

Please refer to FIG. 7, which is a diagram illustrating a signal decoding apparatus 700 according to an embodiment of the present invention. The signal decoding apparatus 700 comprises an envelope extracting apparatus 702, a phase-locked loop 704, and a decoding device 706. The envelope extracting apparatus 702 is arranged to extract an envelope signal Sd' of a receiving modulation signal Sin', and to generate a clock signal Sck' of the receiving modulation signal Sin'. The phase-locked loop 704 is arranged to generate a continuous clock signal Scck' according to the clock signal Sck' and the envelope signal Sd'. The decoding device 706 is arranged to generate a digital output data Sdo' according to the envelope signal Sd' and the continuous clock signal Scck'. The envelope extracting apparatus 702 is similar to the above envelope extracting apparatus 100, thus the detailed description is omitted here for brevity. Here, the envelope signal Sd' is inputted to the phase/frequency detector (not shown) of the phase-locked loop 704.

According to the embodiment, when the envelope extracting apparatus 702 outputs a falling edge of the envelope signal Sd', the phase-locked loop 704 keeps the continuous clock signal Scck' to oscillate under the latest oscillating frequency of the continuous clock signal Scck'. When the envelope extracting apparatus 702 outputs a rising edge of the envelope signal Sd', the phase-locked loop 704 uses the clock signal Sck' as a reference clock signal to generate the continuous clock signal Scck'. More specifically, when the phase-locked loop 704 receives the rising edge of the envelope signal Sd', the phase-locked loop 704 is a closed loop circuit to lock the clock signal Sck' to generate the continuous clock signal Scck'. When the phase-locked loop 704 receives the falling edge of the envelope signal Sd', the phase-locked loop 704 is an open loop circuit, and the phase-locked loop 704 is arranged to fix the continuous clock signal Scck' to oscillate under the latest oscillating frequency. For example, a control voltage of an oscillator (not shown) in the phase-locked loop 704 is set to a fix voltage level to make the oscillator outputs a stable clock signal, i.e. the continuous clock signal Scck'. Accordingly, no matter the voltage level of the envelope signal Sd' is high or low voltage, the phase-locked loop 704 is able to generate a stable clock signal, i.e. the continuous clock signal Scck', to the decoding device 706. By using the stable clock signal, i.e. the continuous clock signal Scck', and the accurate envelope signal Sd' of the receiving modulation signal Sin', the decoding device 706 can precisely demodulate the receiving modulation signal Sin' to generate the digital output data Sdo' even though non-monotonicity/ringing appears in the receiving modulation signal Sin'.

According to the description of the above embodiments, by adaptively adjusting the threshold (e.g. adjusting Vbias2 for coarse adjustment and adjusting delay for fine adjustment) based on the signal level of the ASK modulation signal, the presented envelope extracting apparatus can overcome the inherent issues, i.e. the ripple, the distortion due to non-linearity, and the negative clipping effect, of conventional analog demodulator/detector, and the presented signal decoding apparatus is able to tolerate glitches due to the non-monotonicity of the NFC envelope.

Figure 8:
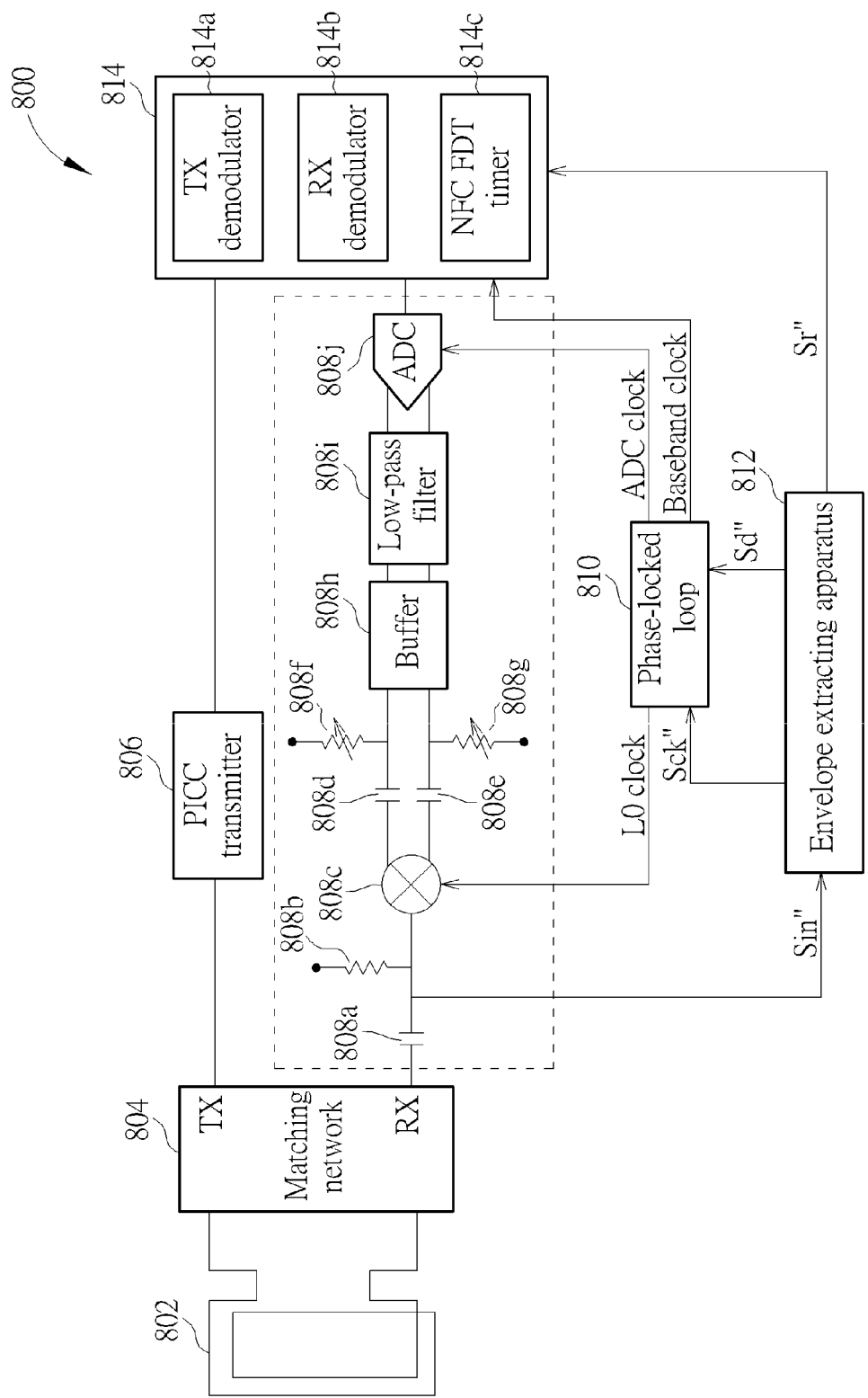
FIG. 8 is a short-distance contactless communication apparatus according to an embodiment of the present invention.

Please refer to FIG. 8, which is a short-distance contactless communication apparatus (e.g. a near-field communication (NFC) apparatus) 800 according to an embodiment of the present invention. It is noted that NFC is just an example of the short-distance contactless communication, and this is not a limitation of the present invention. The short-distance contactless communication apparatus 800 comprises an antenna 802, a matching network 804, a PICC (proximity inductively coupled card) transmitter 806, a receiver 808, a phase-locked loop 810, an envelope extracting apparatus 812, and a baseband processor 814. The receiver 808 comprises a capacitor 808a, a resistor 808b, a mixer 808c, a high-pass filter formed by two capacitors 808d, 808e and two adjustable resistors 808f, 808g, a buffer 808h, a low-pass filter 808i, and an analog-to-digital converter (ADC) 808j. The connectivity of the elements in the receiver 808 is shown in FIG. 8, and the detailed description is omitted for brevity. The phase-locked loop 810 is arranged to generate a LO clock to control the mixer 808c, an ADC clock to control the ADC 808j, and a baseband clock to control the baseband processor 814. It is noted that the LO clock, the ADC clock, and the baseband clock may be the same or different clocks. The baseband processor 814 comprises a TX modulator 814a, an RX demodulator 814b, and a NFC FDT (near field communication frame delay time) timer 814c.

The envelope extracting apparatus 812 is similar to the above envelope extracting apparatus 100, thus the detailed description of the envelope extracting apparatus 812 is omitted here for brevity. As mentioned above, the envelope extracting apparatus 812 is arranged to extract the clock signal Sck" of the receiving modulation signal Sin", and the clock signal Sck" is provided to the phase-locked loop 810. The envelope extracting apparatus 812 also extracts an envelope signal Sd" of the receiving modulation signal Sin", and to output the envelope signal Sd" the phase-locked loop 810. As mentioned above, the envelope extracting apparatus 812 is also able to detect the rising edge Sr" of the envelope of the receiving modulation signal Sin", and to output the rising edge Sr" to the NFC FDT timer 814c.

The NFC FDT timer 814c is arranged to count for a frame delay time FDT according to the envelope of the receiving modulation signal Sin". More specifically, the NFC FDT timer 814c starts to count for the frame delay time FDT when the NFC FDT timer 814c detects the rising edge Sr" of the envelope of the receiving modulation signal Sin" is generated by the envelope extracting apparatus 812. The PICC transmitter 806 is a modulator arranged to transmit a transmitting modulation signal when the frame delay time FDT counted by the timer is up.

For NFC PICC devices to be compliant to ISO 14443, the frame delay time FDT is the time between the transmitting and receiving frames, and the frame delay time FDT must be within the specified timing window, i.e. a specific integer multiple of carrier signal (fc) with tight tolerance of 5/fc. The present envelope extracting apparatus 812 is able of accurately detect the rising edge of the last pause of the receiving modulation signal Sin". In addition, the variation of rising edge caused by the different field amplitude of the receiving modulation signal Sin" can be compensated by the adaptive FDT compensation algorithm in the NFC FDT timer 814c.

Figure 9:
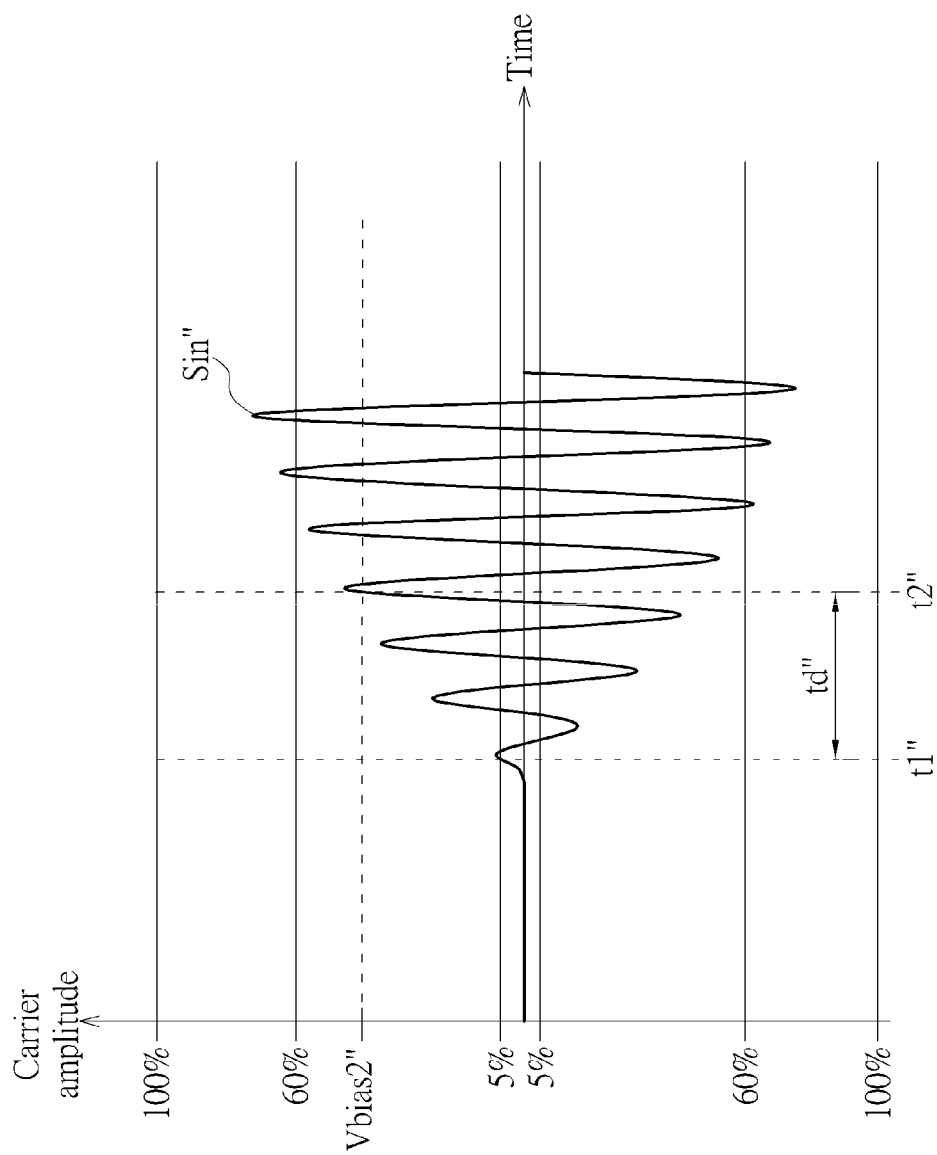
FIG. 9 is a timing diagram illustrating a receiving modulation signal according to an embodiment of the present invention.

Please refer to FIG. 9, which is a timing diagram illustrating the receiving modulation signal Sin" according to an embodiment of the present invention. In FIG. 9, the amplitude of the receiving modulation signal Sin" gradually increases after time t1". The envelope extracting apparatus 812 will need to be triggered, i.e. detect the rising edge of the envelope, in the carrier amplitude from 5% to 60%. In other words, the envelope extracting apparatus 812 must generate the rising edge Sr" to the NFC FDT timer 814c before the carrier amplitude of the receiving modulation signal Sin" beyond 60%. Therefore, the second biasing voltage Vbias2" (similar to the second biasing voltage Vbias2 in FIG. 2) of the envelope extracting apparatus 812 can be set between the 5%-60% of the carrier amplitude of the receiving modulation signal Sin". The second biasing voltage Vbias2" can be adaptively adjusted depending on the carrier amplitude of the receiving modulation signal Sin". Please refer to FIG. 9, there has a delay time td" between the time t1" and the time t2", in which the time t2" is the time when the carrier amplitude of the receiving modulation signal Sin" reaches the second biasing voltage Vbias2". Therefore, the NFC FDT timer 814c will compensate (e.g. subtract) the delay time td" when the NFC FDT timer 814c counts for the frame delay time FDT.

In addition, the frame delay time FDT is not a fixed value. The value of the frame delay time FDT is depended on the last data bit of the receiving modulation signal Sin". More specifically, according to the embodiment, the receiver 808 and/or the RX demodulator 814b will output the last data bit of the receiving modulation signal Sin" to the NFC FDT timer 814c, and the NFC FDT timer 814c refers the last data bit to determine the frame delay time FDT. If the last data bit of the receiving modulation signal Sin" is logic "1" (or bit "1"), the NFC FDT timer 814c sets the frame delay time FDT to be a first delay time FDT1, if the last data bit of the receiving modulation signal Sin" is logic "0" (or bit "0"), the NFC FDT timer 814c sets the frame delay time FDT to be a second delay time FDT2, and the second delay time FDT2 is different from the first delay time FDT1.

Figure 10:
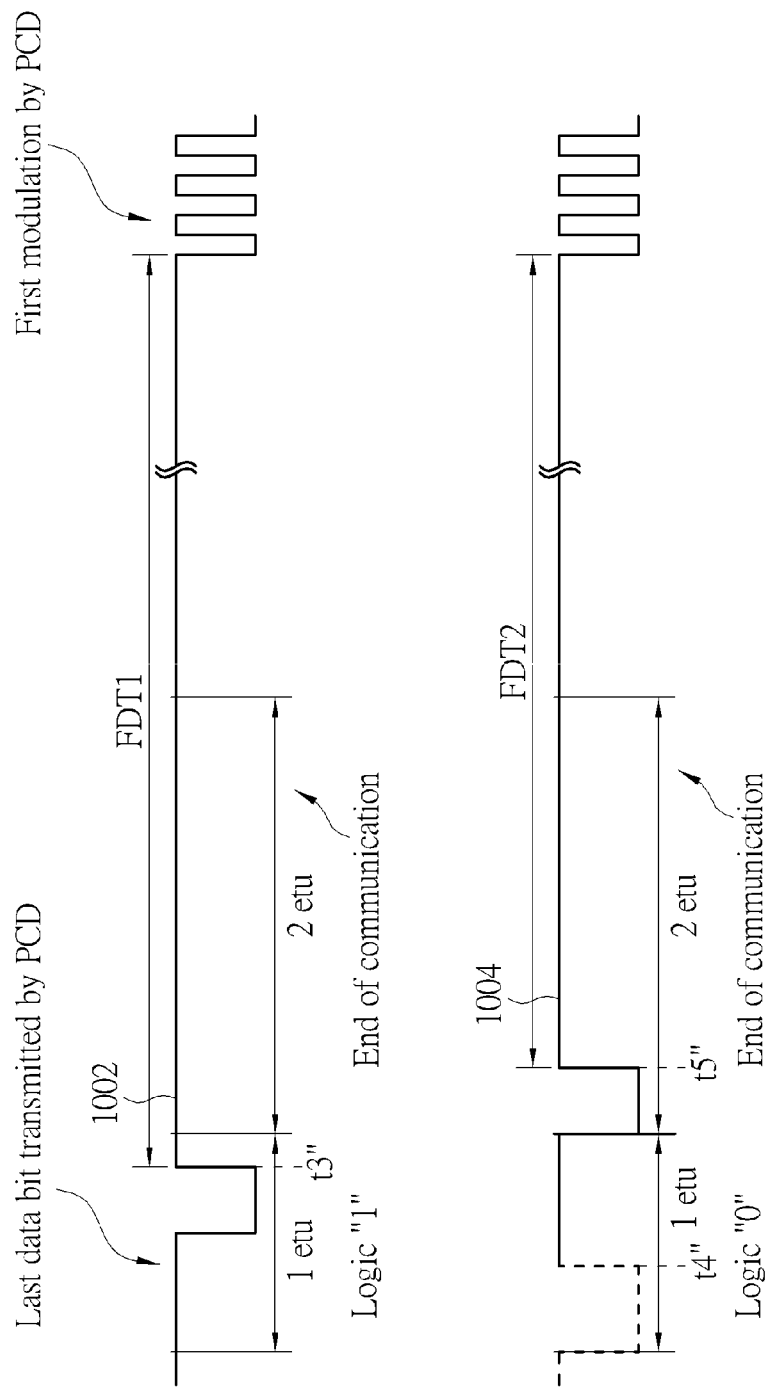
FIG. 10 is a diagram illustrating the envelopes of a receiving modulation signal with the last data bit of logic "1" and logic "0", respectively, according to an embodiment of the present invention.

Please refer to FIG. 10, which is a diagram illustrating the envelopes 1002 and 1004 of the receiving modulation signal Sin" with the last data bit of logic "1" and logic "0", respectively, according to an embodiment of the present invention. When the last data bit transmitted by the PCD (proximity coupling device) is logic "1", the rising edge Sr" of the envelope 1002 is generated at time t3". Then, the NFC FDT timer 814c starts to count for the first delay time FDT1 right after the time t3". In other words, the NFC FDT timer 814c is reset at time t3" when the last data bit is logic "1". However, when the last data bit transmitted by the PCD is logic "0", the rising edge Sr" of the envelope 1002 is not generated at time t4". Instead, the rising edge Sr" of the envelope 1002 is generated at time t5", and the NFC FDT timer 814c starts to count for the second delay time FDT2 right after the time t5". In other words, the NFC FDT timer 814c is reset at time t5" when the last data bit is logic "0" instead of time t4".

As the envelope extracting apparatus 812 is capable of accurately detecting the last rising edge of the receiving modulation signal Sin", the NFC FDT timer 814c can be accurately reset no matter the last data bit is logic "1" or logic "0". Accordingly, by using the present envelope extracting apparatus 812, the PICC transmitter 806/TX modulator 814a can accurately transmit the transmitting modulation signal complying with the FDT requirement of ISO 14443.

Figure 11:
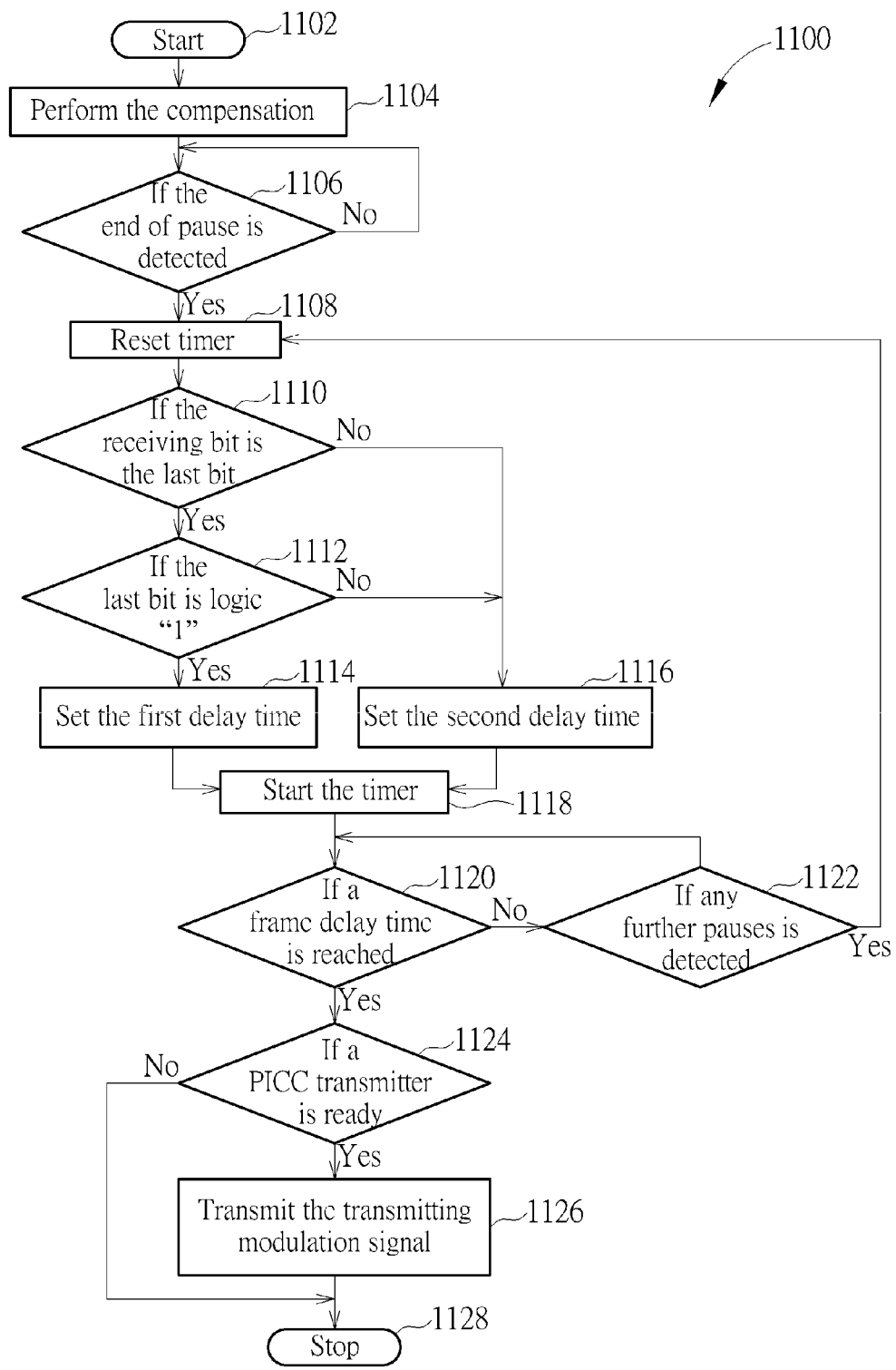
FIG. 11 is a flowchart illustrating an adaptive frame delay time FDT algorithm according to an embodiment of the present invention.

In summary, the operation of the short-distance contactless communication apparatus 800 can be summarized into the following steps in FIG. 11. FIG. 11 is a flowchart illustrating the adaptive frame delay time FDT algorithm 1100 according to an embodiment of the present invention. Provided that substantially the same result is achieved, the steps of the flowchart shown in FIG. 11 need not be in the exact order shown and need not be contiguous; that is, other steps can be intermediate. The adaptive frame delay time FDT algorithm 1100 comprises the steps:

Step 1102: Start the operation of determining the frame delay time FDT;

Step 1104: Perform the compensation of the frame delay time FDT;

Step 1106: Determine if the end of pause (i.e. the rising edge Sr") is detected, if yes, go to step 1108, if no, go to step 1106;

Step 1108: Reset the NFC FDT timer 914c;

Step 1110: Determine if the receiving bit is the last bit, if yes, go to step 1112, if no, go to step 1116;

Step 1112: Determine if the value of the last bit is logic "1", if yes, go to step 1114, if no, go to step 1116;

Step 1114: Set the frame delay time FDT to be the first delay time FDT1, go to step 1118;

Step 1116: Set the frame delay time FDT to be the second delay time FDT2, go to step 1118;

Step 1118: Start the NFC FDT timer 814c;

Step 1120: Determine if the frame delay time FDT is reached, if yes, go to step 1124, if no, go to step 1122;

Step 1122: Determine if any further pauses (i.e. the rising edge Sr") is detected, if yes, go to step 1108, if no, go to step 1120;

Step 1124: Determine if the PICC transmitter 806 is ready to transmit the transmitting modulation signal, if yes, go to step 1126, if no, go to step 1128;

Step 1126: The PICC transmitter 806 starts to transmit the transmitting modulation signal;

Step 1128: Stop the operation of determining the frame delay time FDT.

Figure 12:
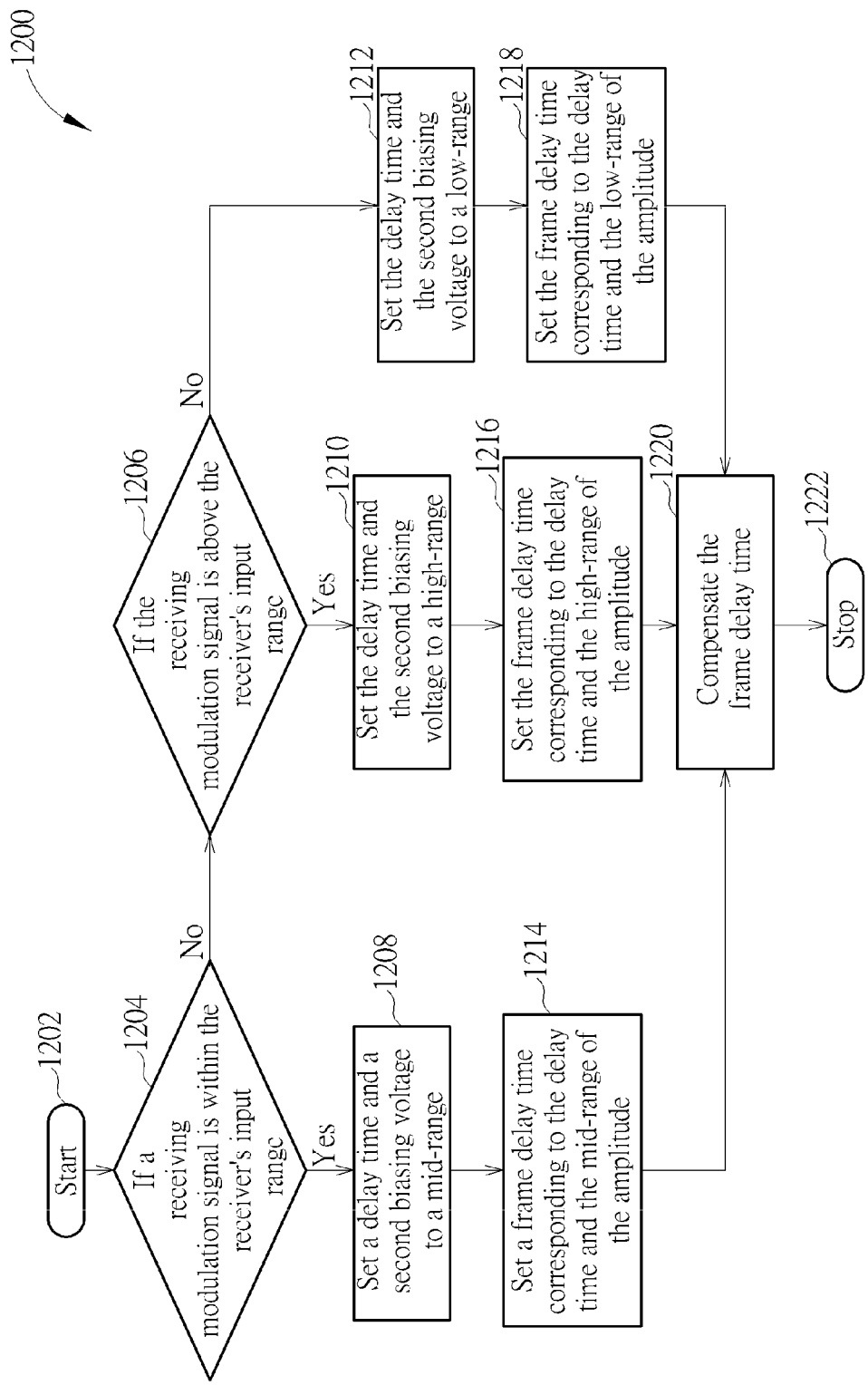
FIG. 12 is a flowchart illustrating a method of the compensation of a frame delay time FDT according to an embodiment of the present invention.

In addition, the compensation of the frame delay time FDT in step 1104 can be summarized into the following steps in FIG. 12. FIG. 12 is a flowchart illustrating a method 1200 of the compensation of the frame delay time FDT according to an embodiment of the present invention. Provided that substantially the same result is achieved, the steps of the flowchart shown in FIG. 12 need not be in the exact order shown and need not be contiguous; that is, other steps can be intermediate. The method 1200 comprises the steps:

Step 1202: Start the compensation of the frame delay time FDT;

Step 1204: Determine if the amplitude of the receiving modulation signal Sin" is within the receiver's input range, if yes, go to step 1208, if no, go to step 1206;

Step 1206: Determine if the amplitude of the receiving modulation signal Sin" is above the receiver's input range, if yes, go to step 1210, if no, go to step 1212;

Step 1208: Set the delay time of DFF clock and the second biasing voltage Vbias2" to a mid-range for detecting if the receiving modulation signal Sin" is the Type A NFC signal, go to step 1214;

Step 1210: Set the delay time of DFF clock and the second biasing voltage Vbias2" to a high-range for detecting if the receiving modulation signal Sin" is the Type A NFC signal, go to step 1216;

Step 1212: Set the delay time of DFF clock and the second biasing voltage Vbias2" to a low-range for detecting if the receiving modulation signal Sin is the Type A NFC signal, go to step 1218;

Step 1214: Set the frame delay time FDT to compensate for the delay time td" corresponding to the delay time and the second biasing voltage Vbias2" setting in the mid-range of the amplitude, go to step 1220;

Step 1216: Set the frame delay time FDT to compensate for the delay time td" corresponding to the delay time and the second biasing voltage Vbias2" setting in the high-range of the amplitude, go to step 1220;

Step 1218: Set the frame delay time FDT to compensate for the delay time td" corresponding to the delay time and the second biasing voltage Vbias2" setting in the low-range of the amplitude, go to step 1220;

Step 1220: Compensate the frame delay time FDT counted by the NFC FDT timer 814c;

Step 1222: Stop the compensation of the frame delay time FDT.

Accordingly, in the present invention, the method and systems to generate accurate FDT delay time is presented. An adaptive pause detector (e.g. the presented edge detecting device 106) is presented to detect the pauses of Type A NFC signal. The end of pause (i.e. the rising edge) which is used as the reset signal for the NFC FDT time can be detected accurately within the range from 5% to 60% of the NFC carrier amplitude. The threshold of the pause detector is set based on the information of the carrier amplitude level. This will minimize the variation of the rising edge of the pause detector for wide input NFC field dynamic range. The adaptive FDT algorithm can compensate the delay of the pause detector in which the delay of the pause detector varies according to the NFC field amplitude level. In addition, the rising edge of the pause detector is used to reset the FDT timer. The digital demodulator outputs the last data bit information to set the corresponding FDT timer's threshold, i.e. set the FDT delay target count based on logic "0" or "1" of the last data bit.

Briefly, by adaptively adjusting the threshold voltage level based on the signal level of the ASK modulation signal, the presented envelope extracting apparatus can precisely detect the falling edge and the rising edge of the envelope of the receiving modulation signal. Based on the envelope waveform extracted by the envelope extracting apparatus, the decoding device can precisely demodulate the receiving modulation signal to generate the digital output data. Based on the falling edge extracted by the envelope extracting apparatus, the phase-locked loop can generates continuous clock immune from noise and glitches. Moreover, based on the rising edge extracted by the envelope extracting apparatus, the frame delay time counted by the NFC FDT timer can be accurately set.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. An envelope extracting apparatus, comprising:
a clock extracting device, arranged to extract a clock signal of a receiving modulation signal according to a first biasing voltage; and
an edge detecting device, arranged to generate a detecting signal to indicate an envelope edge of the receiving modulation signal according to a delayed clock signal of the clock signal and a second biasing voltage;
wherein the second biasing voltage or a delay time of the clock signal is adjustable.

2. The envelope extracting apparatus of claim 1, wherein the clock extracting device comprises:
a comparator, arranged to compare a voltage level of the receiving modulation signal with the first biasing voltage to output the clock signal; and
a delay circuit, arranged to delay the clock signal by the delay time.

3. The envelope extracting apparatus of claim 1, further comprising:
a determining device, arranged to determine the delay time and an offset voltage according to the receiving modulation signal;
wherein the delayed clock signal is generated by delaying the clock signal by the delay time, and the second biasing voltage is generated by offsetting the first biasing voltage by the offset voltage.

4. The envelope extracting apparatus of claim 3, wherein the determining device determines the delay time and the offset voltage according to a signal type of the receiving modulation signal.

5. The envelope extracting apparatus of claim 3, wherein the determining device comprises:
a level detector, arranged to detect an amplitude of the receiving modulation signal; and
a setting circuit, arranged to set the delay time and the offset voltage according to the amplitude of the receiving modulation signal.

6. The envelope extracting apparatus of claim 3, wherein the edge detecting device comprises:
a comparator, arranged to compare a voltage level of the receiving modulation signal with the second biasing voltage to output a comparing output signal;
a delay circuit, arranged to delay the clock signal by the delay time to generate the delayed clock signal; and
a latching circuit, arranged to latch the comparing output signal by using the delayed clock signal to generate the detecting signal.

7. The envelope extracting apparatus of claim 1, wherein the detecting signal indicates the envelope edge is a falling edge when the detecting signal changes to a low voltage level from a high voltage, and the detecting signal indicates the envelope edge is a rising edge when the detecting signal changes to the high voltage level from the low voltage.

8. An envelope extracting method, comprising:
extracting a clock signal of a receiving modulation signal according to a first biasing voltage; and
generating a detecting signal to indicate an envelope edge of the receiving modulation signal according to a delayed clock signal of the clock signal and a second biasing voltage;
wherein the second biasing voltage or a delay time of the clock signal is adjustable.

9. The envelope extracting method of claim 8, wherein the step of extracting the clock signal of the receiving modulation signal according to the first biasing voltage comprises:
comparing a voltage level of the receiving modulation signal with the first biasing voltage to output the clock signal; and
delaying the clock signal by the delay time.

10. The envelope extracting method of claim 8, further comprising:
determining a delay time and an offset voltage according to the receiving modulation signal;

wherein the delayed clock signal is generated by delaying the clock signal by the delay time, and the second biasing voltage is generated by offsetting the first biasing voltage by the offset voltage.

11. The envelope extracting method of claim 10, wherein the delay time and the offset voltage are determined in accordance with a signal type of the receiving modulation signal.

12. The envelope extracting method of claim 10, wherein the step of determining the delay time and the offset voltage according to the receiving modulation signal comprises:
   detecting an amplitude of the receiving modulation signal; and
   setting the delay time and the offset voltage according to the amplitude of the receiving modulation signal.

13. The envelope extracting method of claim 10, wherein the step of generating the detecting signal comprises:
   comparing a voltage level of the receiving modulation signal with the second biasing voltage to output a comparing output signal;
   delaying the clock signal by the delay time to generate the delayed clock signal; and
   latching the comparing output signal by using the delayed clock signal to generate the detecting signal.

14. The envelope extracting method of claim 8, wherein the detecting signal indicates the envelope edge is a falling edge when the detecting signal changes to a low voltage level from a high voltage, and the detecting signal indicates the envelope edge is a rising edge when the detecting signal changes to the high voltage level from the low voltage.

* * * * *